United States Patent
Arwine

(10) Patent No.: US 9,651,944 B2
(45) Date of Patent: May 16, 2017

(54) UNMANNED AERIAL VEHICLE PILOTING AUTHORIZATION

(71) Applicant: Microsoft Technology Licensing, LLC, Redmond, WA (US)

(72) Inventor: Troy J. Arwine, Cantonment, FL (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 241 days.

(21) Appl. No.: 14/664,893

(22) Filed: Mar. 22, 2015

(65) Prior Publication Data

US 2016/0274578 A1    Sep. 22, 2016

(51) Int. Cl.
  *G06F 7/00*   (2006.01)
  *G05D 1/00*   (2006.01)
  *H04L 29/06*  (2006.01)

(52) U.S. Cl.
  CPC ........ *G05D 1/0011* (2013.01); *H04L 63/0823* (2013.01)

(58) Field of Classification Search
  CPC .......................... G05D 1/0011; H04L 63/0823
  See application file for complete search history.

(56) References Cited

U.S. PATENT DOCUMENTS

| | | |
|---|---|---|
| 6,965,816 B2 | 11/2005 | Walker |
| 7,127,334 B2 | 10/2006 | Frink |
| 8,052,096 B2 | 11/2011 | Cerchie |
| 8,656,162 B2 | 2/2014 | Roy et al. |
| 8,838,289 B2 | 9/2014 | Margolin |

(Continued)

FOREIGN PATENT DOCUMENTS

| | | |
|---|---|---|
| CN | 101833870 A | 9/2010 |
| WO | 2014115139 A1 | 7/2014 |
| WO | 2014127429 A1 | 8/2014 |

OTHER PUBLICATIONS

Dolan, et al., "Integration of Drones into Domestic Airspace: Selected Legal Issues", In Proceeding of Congressional Research Service, Apr. 4, 2013, 33 pages.

(Continued)

*Primary Examiner* — Adam Alharbi
(74) *Attorney, Agent, or Firm* — Lyon & Harr, LLP; Richard T. Lyon

(57) ABSTRACT

Unmanned aerial vehicle (UAV) piloting authorization implementations are presented that authorize a pilot to operate a UAV in regulated airspace. In general, a UAV authorization system is employed which incorporates a control authorization unit into a UAV controller device and a control instruction authentication unit into a UAV. The control authorization unit obtains a signed digital certificate associated with a UAV pilot, checks that it is signed by a trusted signatory, and then determines that it is currently valid using cloud or server based validation service. If the digital certificate is currently valid, the pilot is allowed to initiate control instructions via the UAV controller device. The signed digital certificate is attached to any control instructions initiated by the pilot before transmission to the UAV. The control instruction authentication unit goes through a similar procedure to authenticate any received control instruction before allowing the UAV to execute the instruction.

20 Claims, 11 Drawing Sheets

(56) References Cited

U.S. PATENT DOCUMENTS

| | | |
|---|---|---|
| 9,412,278 B1* | 8/2016 | Gong .................... H04L 63/101 |
| 2003/0055540 A1 | 3/2003 | Hansen |
| 2008/0072284 A1 | 3/2008 | Horvitz et al. |
| 2012/0069131 A1* | 3/2012 | Abelow ............... G06Q 10/067 |
| | | 348/14.01 |
| 2014/0163852 A1 | 6/2014 | Borri et al. |
| 2016/0285863 A1* | 9/2016 | Canavor ............. H04L 63/0823 |

OTHER PUBLICATIONS

Gates, Rod, "Securing the Connected Aircraft", In Proceedings of the Air Transport Association Digital Security Working Group, Oct. 30, 2009, 61 pages.

"Drones in Canada", Published on: Mar. 2013, Available at: https://www.priv.gc.ca/information/research-recherche/2013/drones_201303_e.pdf.

* cited by examiner

UNMANNED AERIAL VEHICLE PILOTING AUTHORIZATION

BACKGROUND

An unmanned aerial vehicle (UAV) is an aircraft of various configurations that has no pilot aboard. Rather, a UAV is typically piloted remotely by a pilot using a controller device that is in communication with the UAV. UAVs can be used for a variety of tasks including surveillance, reconnaissance, scientific data gathering, search and rescue, surveying, commercial delivery of products, and recreational flights, to name a few. A UAV is thus useful to the military, law enforcement, universities, civil institutions, commercial enterprises and the general public.

SUMMARY

The UAV piloting authorization implementations described herein generally involve at least one of authorizing a pilot to operate a UAV, validating that a pilot is authorized to operate a UAV, and authenticating and executing control instructions initiated by a pilot authorized to operate a UAV.

In one implementation, a UAV authorization system is employed to authorize a pilot to operate a UAV in regulated airspace. In general, this involves the use of a control authorization unit associated with a UAV controller device. The control authorization unit is made up of at least a processor, a communication interface and memory, and is in communication, via the communication interface, with the UAV controller device that is in turn in communication with a UAV. The control authorization unit includes an authorizer operating on the aforementioned processor. The authorizer receives an identification code from the UAV controller device that was entered into the device by the pilot, and transmits the identification code to a digital certificate storage unit. The authorizer then receives a signed digital certificate from the digital certificate storage unit whenever the identification code corresponds to a signed digital certificate stored therein. Next, the authorizer determines if the digital certificate is signed by a trusted signatory whose signature is in stored in the control authorization unit memory. If it is determined that the digital certificate is signed by a trusted signatory, the pilot is deemed to be authenticated. If the pilot is deemed to be authenticated, the authorizer then transmits a validation request via the communication interface to a validation service to determine whether the digital certificate is currently valid. The validation service returns an indication as to whether the certificate is currently valid, which is received by the authorizer via the communication interface. The authorizer next determines if the received indicator indicates that the digital certificate is currently valid. If it is currently valid, the authorizer authorizes the pilot to initiate control instructions via the UAV controller device, and attaches the signed digital certificate to any control instructions initiated by the pilot. The instructions are transmitted to the UAV in the normal manner by the UAV controller device. If, however, the received indicator indicates the digital certificate is invalid, the authorizer does not authorize the pilot to initiate control instructions via the UAV controller device, and any control instructions initiated by the pilot via the UAV controller are not transmitted to the UAV for flights within a regulated airspace.

In another implementation, a UAV authorization system is employed to authenticate and execute control instructions initiated by a pilot authorized to operate a UAV. In general, this involves incorporating a control instruction authentication unit into a UAV. The control instruction authentication unit is made up of at least a processor, a communication interface and memory, and is in communication, via the communication interface, with the UAV that is in turn in communication with a UAV controller device. The control instruction authentication unit includes a validator operating on the aforementioned processor. The validator receives a control instruction from a UAV controller device. The control instruction also includes a signed digital certificate. The validator next determines if the digital certificate received in the control instruction is signed by a trusted signatory whose signature is stored in the control instruction authentication unit's memory. If it is determined that the digital certificate is signed by a trusted signatory, the validator then transmits a validation request via the communication interface to a validation service to determine whether the digital certificate is currently valid. The validation service returns an indication as to whether the certificate is currently valid, which is received by the validator via the communication interface. The validator next determines if the received indicator indicates that the digital certificate is currently valid. If it is currently valid, the validator allows the UAV to execute the received control instruction. If, however, the received indicator indicates the digital certificate is invalid, the validator does not allow the UAV to execute the control instruction.

In another implementation, a UAV pilot validation system is employed for validating that a pilot is authorized to operate a UAV. The UAV pilot validation system is made up of one or more computing devices, which are in communication with each other via a computer network whenever there are multiple computing devices, and a computer program having program modules executable by the one or more computing devices. The UAV pilot validation service receives a validation request from a control authorization unit associated with a UAV controller device or control instruction authentication unit associated with a UAV. The validation request includes a digital certificate that has been issued to and identifies a pilot of the UAV. The UAV pilot validation service then determines whether the digital certificate included in the received validation request is currently valid. A validation indicator indicating whether the received digital certificate is currently valid is then transmitted to the aforementioned control authorization unit or control instruction authentication unit.

It should be noted that the foregoing Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter. Its sole purpose is to present some concepts of the claimed subject matter in a simplified form as a prelude to the more detailed description that is presented below.

DESCRIPTION OF THE DRAWINGS

The specific features, aspects, and advantages of the disclosure will become better understood with regard to the following description, appended claims, and accompanying drawings where:

DETAILED DESCRIPTION

Figure 1:
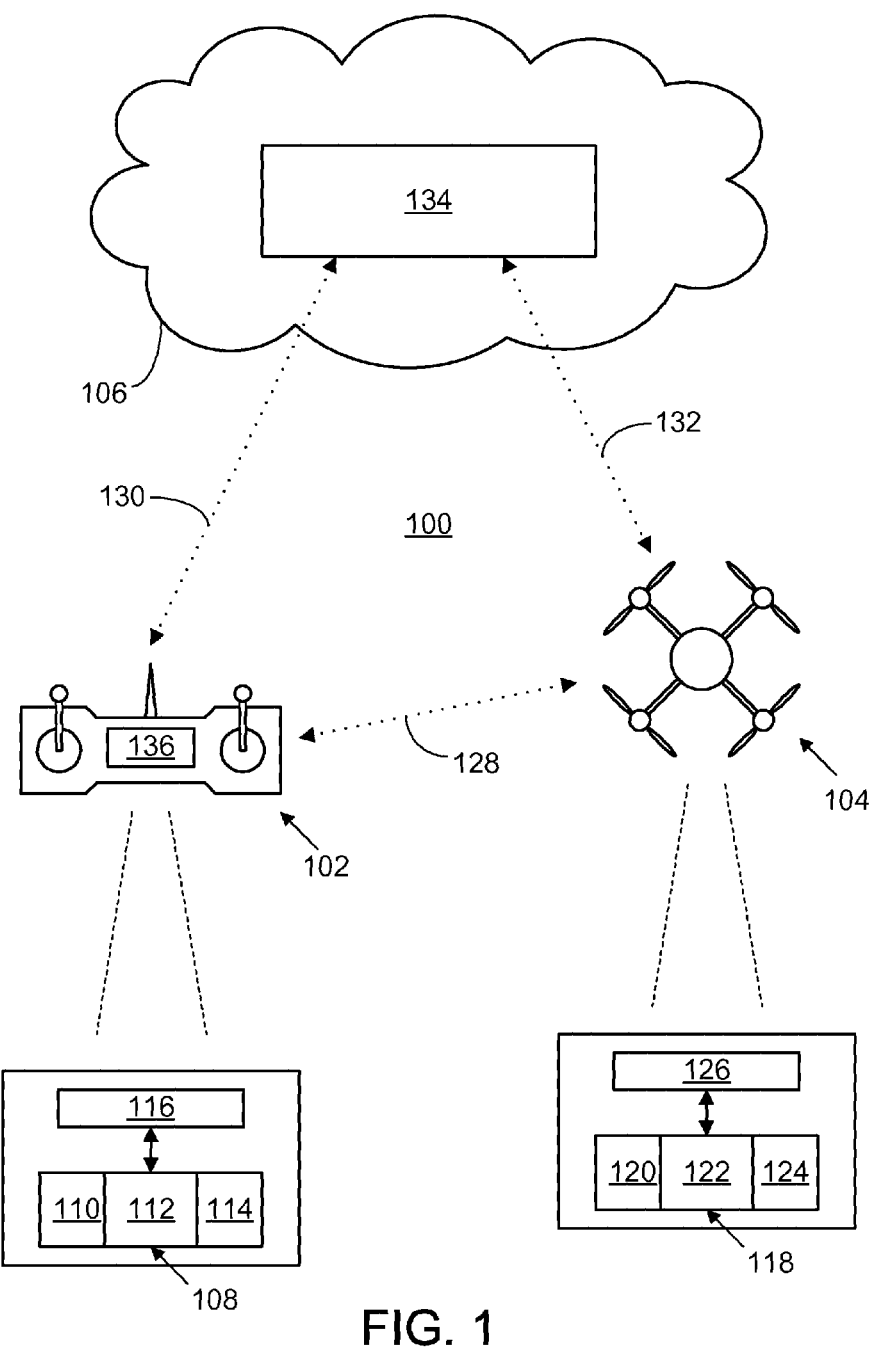
FIG. 1 is a diagram of a framework for a system that authorizes a pilot to operate an unmanned aerial vehicle (UAV) in regulated airspace.

In the following description reference is made to the accompanying drawings which form a part hereof, and in which are shown, by way of illustration, specific versions in which UAV piloting authorization implementations can be practiced. It is understood that other implementations can be utilized and structural changes can be made without departing from the scope thereof.

It is also noted that for the sake of clarity specific terminology will be resorted to in describing the UAV piloting authorization implementations and it is not intended for these implementations to be limited to the specific terms so chosen. Furthermore, it is to be understood that each specific term includes all its technical equivalents that operate in a broadly similar manner to achieve a similar purpose. Reference herein to "one implementation", or "another implementation", or an "exemplary implementation", or an "alternate implementation" means that a particular feature, a particular structure, or particular characteristics described in connection with the implementation can be included in at least one version of the UAV piloting authorization. The appearances of the phrases "in one implementation", "in another implementation", "in an exemplary implementation", and "in an alternate implementation" in various places in the specification are not necessarily all referring to the same implementation, nor are separate or alternative implementations mutually exclusive of other implementations. Yet furthermore, the order of process flow representing one or more implementations of the UAV piloting authorization does not inherently indicate any particular order or imply any limitations thereof.

As utilized herein, the terms "component," "system," "client" and the like are intended to refer to a computer-related entity, either hardware, software (e.g., in execution), firmware, or a combination thereof. For example, a component can be a process running on a processor, an object, an executable, a program, a function, a library, a subroutine, a computer, or a combination of software and hardware. By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, to the extent that the terms "includes," "including," "has," "contains," and variants thereof, and other similar words, are used in either this detailed description or the claims, these terms are intended to be inclusive in a manner similar to the term "comprising" as an open transition word without precluding any additional or other elements.

1.0 Unmanned Aerial Vehicle Piloting Authorization

Regulation of unmanned aerial vehicles (UAVs) is currently in the state of flux. In the past, a largely unregulated environment existed where UAVs were treated akin to model airplanes, and most regulations were voluntary in nature. However, recent incidents involving UAVs have resulted in a regulatory backlash where almost any operation of a UAV out of the pilot's line of site is prohibited. It is believed this almost total prohibition will soon give way to a more considered regulatory scheme. The UAV piloting authorization implementations described herein envision a regulatory environment where in order to operate a UAV in "regulated" airspace a pilot (commercial or private) applies for and obtains a UAV license from a governing licensing agency. For example, in the United States the governing licensing agency could be the Federal Aviation Administration (FAA) for commercial and private UAV pilots, and the Department of Defense (DoD) for military UAV pilots. The licensing process could be similar to the one a small aircraft pilot goes through, which can include written and performance testing, as well as extensive background checks to confirm the applicant identity and to review an applicant's relevant past history.

1.1 System Framework

In general, the UAV piloting authorization implementations described herein are realized in a system framework that authorizes a pilot to operate an unmanned aerial vehicle (UAV) in regulated airspace. Referring to FIG. 1, in one implementation this framework 100 includes a UAV controller device 102 that remotely controls a UAV 104, and a UAV pilot validation service 106 that is used to validate whether a pilot is authorized to operate a UAV in regulated airspace (among other tasks that will be described later).

The UAV controller device 102 includes a control authorization unit 108 having a least a processor 110, a communication interface 112 and memory 114. This control authorization unit 108 uses its communication interface 112 to effect communications with the UAV controller device 102 via the device's communication component 116 using conventional communication avenues. In one version, the control authorization unit 108 is resident in the UAV controller device 102, although this need not be the case. The UAV controller device 102 is in turn in remote communication with the UAV 104 via the communication component 116.

These communications 128 can be accomplished in a variety of ways, including conventional communications schemes such as direct radio frequency communications, communications via satellite, cellular communications, and so on. The control authorization unit 108 also uses its communication interface 112 to effect communications with the UAV pilot validation service 106. These communications 130 can be accomplished through the UAV controller device's communication component 116, or directly. When the control authorization unit 108 is resident in the UAV controller device 102, communications through the UAV controller device's communication component 116 are advantageous for the sake of simplicity. When the control authorization unit 108 is not resident in the UAV controller device 102, direct communication is advantageous for the same reason. These communications 130 with the UAV pilot validation service 106 can be accomplished in a variety of ways, including conventional communications schemes such as WiFi, cellular, satellite, or other wireless networks; and an Internet connection.

The UAV 104 includes a control instruction authentication unit 118 having at least a processor 120, a communication interface 122 and memory 124. This control instruction authentication unit 118 uses its communication interface 122 to effect communications with the UAV 104 via its communication component 126 using conventional communication avenues. The control instruction authentication unit 118 is resident in the UAV 104. As indicated previously, the UAV 104 is in turn in remote communication with the UAV controller device 102 via its communication component 126. These communications 128 can be accomplished in a variety of ways, including conventional communications schemes such as direct radio frequency communications, communications via satellite, cellular communications, and so on. The control instruction authentication unit 118 also uses its communication interface 122 to effect communications with the UAV pilot validation service 106. These communications 132 can be accomplished through the UAV's communication component 126, or directly. The communications 132 with the UAV pilot validation service 106 can be accomplished in a variety of ways, including conventional communications schemes (such as a 3G/4G/LTE cellular network, satellite link, or other wireless network; and an Internet connection to the UAV pilot validation service).

The UAV pilot validation service 106 includes one or more computing devices 134, which when there are multiple computing devices are in communication with each other via a computer network. These computing device(s) are also in communication with the UAV controller device's control authorization unit 108 and the UAV's control instruction authentication unit 118, as described previously. The UAV pilot validation service 106 can be realized as either a cloud based or server-client based system.

The UAV controller device 102, UAV 104 and UAV pilot validation service 106 will now be described in more detail in the sections to follow.

1.2 UAV Controller Device

In general, the UAV controller device referred to previously is any device that is designed to control the takeoff, flight and landing of a UAV. Many such devices are currently available. For example, UAV controller device can take the form of a standard UAV radio controller, a personal computing device configured to operate as a UAV controller, mobile computing devices configured to operate as a UAV controller, or even a radio tower configured to operate as UAV controller, among other devices. However, in the UAV piloting authorization implementations described herein, the UAV controller device has been modified to include the aforementioned control authorization unit. As described previously, the control authorization unit includes at least a processor, a communication interface and memory. It is noted that while these components are shown as separate elements in FIG. 1, in one version they share the existing hardware of the UAV controller device.

Figure 2A:
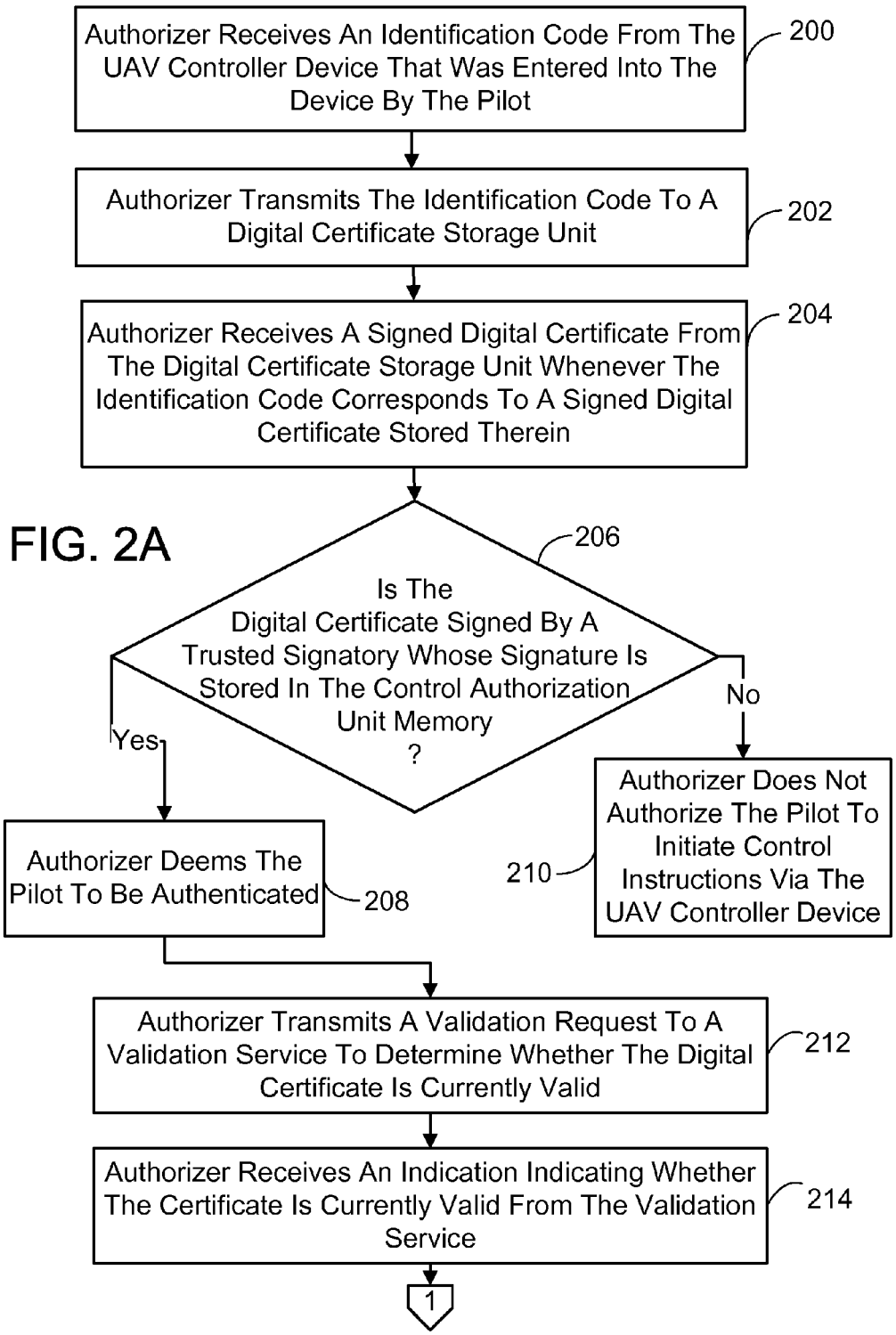
FIGS. 2A-B depict a flow diagram illustrating an exemplary implementation, in simplified form, of a process used by a control authorization unit associated with a UAV controller device to authorize a pilot to operate a UAV in regulated airspace.
Figure 2B:
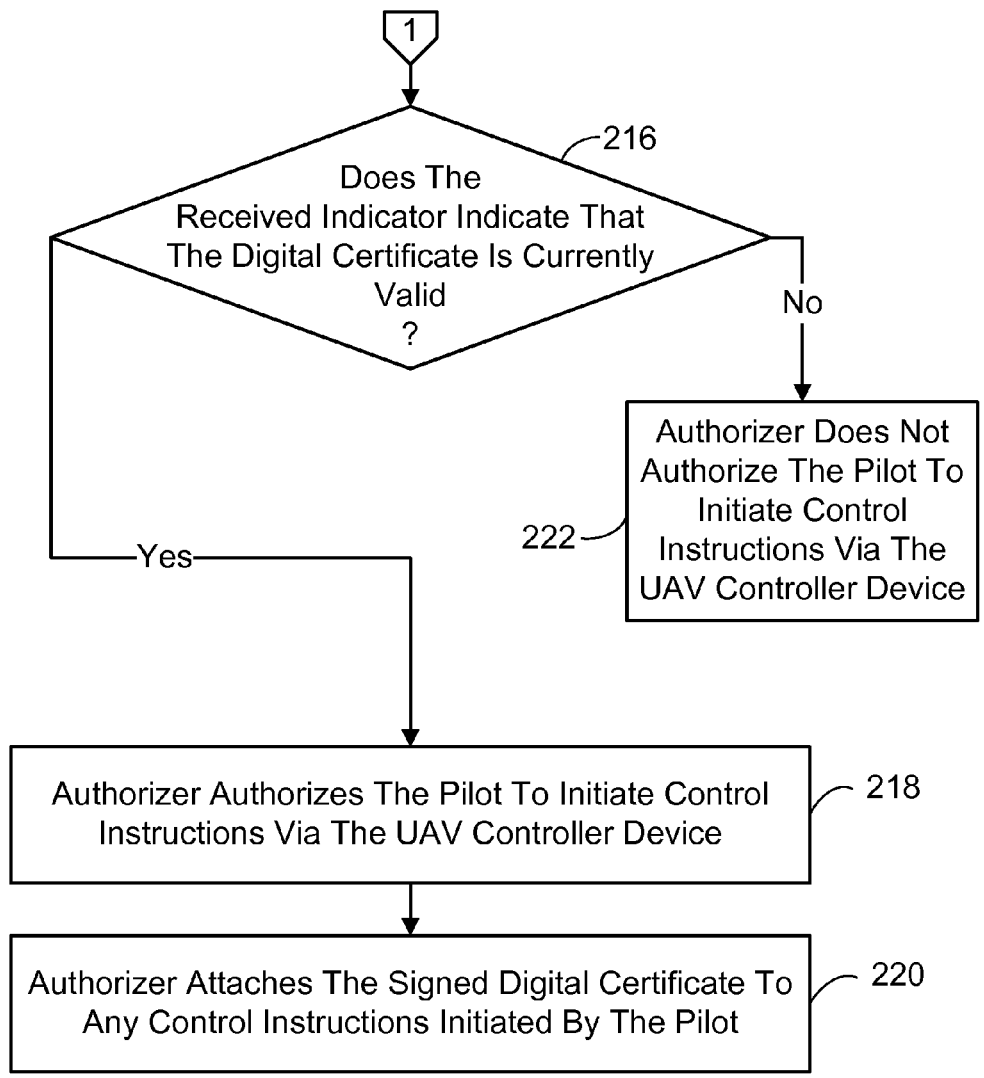

In one implementation, the control authorization unit includes an authorizer operating on the aforementioned processor. Referring to FIGS. 2A-B, the authorizer first receives an identification code from the UAV controller device that was entered into the device by the pilot (action 200). In one version, the identification code is a standard personal identification number (PIN). The identification code can be entered into the UAV controller device in any appropriate fashion. For example, many UAV controllers have directional controls (e.g., joy sticks, buttons, trackballs, and so on). These directional controls can be used by a pilot to enter an identification code where each element in the code is a direction (e.g., up, up, left, right, left, right). Another way the identification code can be entered into the UAV controller device is via an integrated or external keypad or full keyboard (e.g., an external keyboard that is in communication with the UAV controller device via a wired or wireless connection). In such a case, the identification code can be a numeric or alphanumeric sequence.

Referring again to FIGS. 2A-B, the authorizer next transmits the identification code to a digital certificate storage unit (action 202), and then receives a signed digital certificate from the digital certificate storage unit whenever the identification code corresponds to a signed digital certificate stored therein (action 204). The nature of the digital certificate will be described in more detail shortly.

In one implementation, the digital certificate storage unit takes the form of a conventional smart card. Smart cards provide tamper-resistant authentication through onboard private key storage. To accommodate the use of a smart card as the digital certificate storage unit, a smart card reader can be incorporated into the UAV controller device itself (as is shown by the smart card reader 136 in FIG. 1). In another version, an existing or added USB port of the UAV controller device is connected to a USB-based smart card reader. It is further noted that the digital certificate storage unit can take forms other than a smart card. For example, the digital certificate storage unit can be a hardware token; or a personal or mobile computing device that uses multi-factor authentication like a smart card.

Referring again to FIGS. 2A-B, once the authorizer receives the signed digital certificate from the digital certificate storage unit, it then determines if the digital certificate is signed by a trusted signatory whose signature is stored in the control authorization unit memory (action 206). The trusted signatories can include an applicable governing agency (such as those described previously in the regulatory scheme) and/or entities entrusted to issue digital certificates to UAV pilots on behave of the governing agency. If it is determined that the digital certificate is signed by a trusted signatory, the pilot is deemed to be authenticated (action 208). If, however, it is determined that the digital certificate is not signed by a trusted signatory, the authorizer does not authorize the pilot to initiate control instructions via the UAV controller device (action 210), and any control instructions initiated by the pilot via the UAV controller are ignored. It is noted that in one implementation, the pilot would not be precluded from operating the UAV in non-regulated airspace (e.g., flying in low altitudes on private property or in areas outside the jurisdiction of the governing authority) despite having a digital certificate that is not signed by a trusted signatory.

Referring again to FIGS. 2A-B, if the pilot is deemed to be authenticated, the authorizer then transmits a validation request via the communication interface to a validation service to determine whether the digital certificate is currently valid (action 212). The operations of the validation service will be described in more detail later; however, in general, the validation service ensures that the digital certificate is issued from the appropriate governing authority or an authorized surrogate to a licensed UAV pilot, as well as checking that the digital certificate has not been revoked. The validation service returns an indication as to whether the certificate is currently valid, which is received by the authorizer via the communication interface (action 214). The authorizer next determines if the received indicator indicates that the digital certificate is currently valid (action 216). If it is currently valid, the authorizer authorizes the pilot to initiate control instructions via the UAV controller device (action 218). The authorizer also attaches the signed digital certificate to any control instructions initiated by the pilot (action 220), and the instructions are transmitted to the UAV in the normal manner by the UAV controller device. If, however, the received indicator indicates the digital certificate is invalid (for reasons including, but not limited to, a cancelled pilot license or revoked digital certificate), the authorizer does not authorize the pilot to initiate control instructions via the UAV controller device (action 222), and any control instructions initiated by the pilot via the UAV controller are not transmitted to the UAV for flights within a regulated airspace. It is noted that in one implementation, the pilot would not be precluded from operating the UAV in non-regulated airspace (e.g., flying in low altitudes on private property or in areas outside the jurisdiction of the governing authority) despite having an invalid digital certificate.

1.3 Unmanned Aerial Vehicle

Many types of unmanned aerial vehicles are currently available. However, in the UAV piloting authorization implementations described herein, the UAV has been modified to include the aforementioned control instruction authentication unit. As described previously, the control instruction authentication unit is resident in the UAV; and includes at least a processor, a communication interface and memory. It is noted that while these components are shown as separate elements in FIG. 1, in one version they share the existing hardware of the UAV.

Figure 3A:
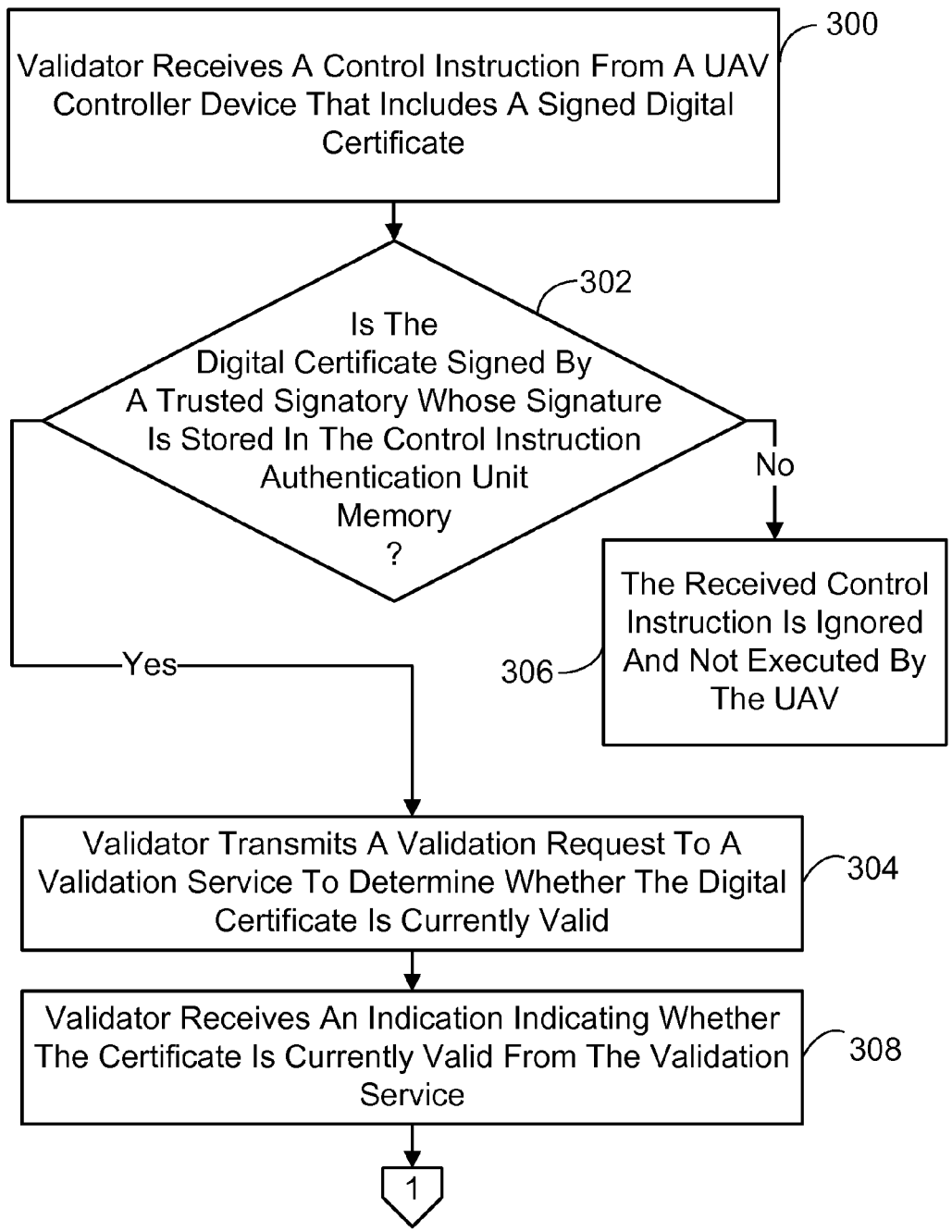
FIGS. 3A-B depict a flow diagram illustrating an exemplary implementation, in simplified form, of a process used by a control instruction authentication unit resident in a UAV to authenticate and execute control instructions initiated by a pilot authorized to operate a UAV.
Figure 3B:
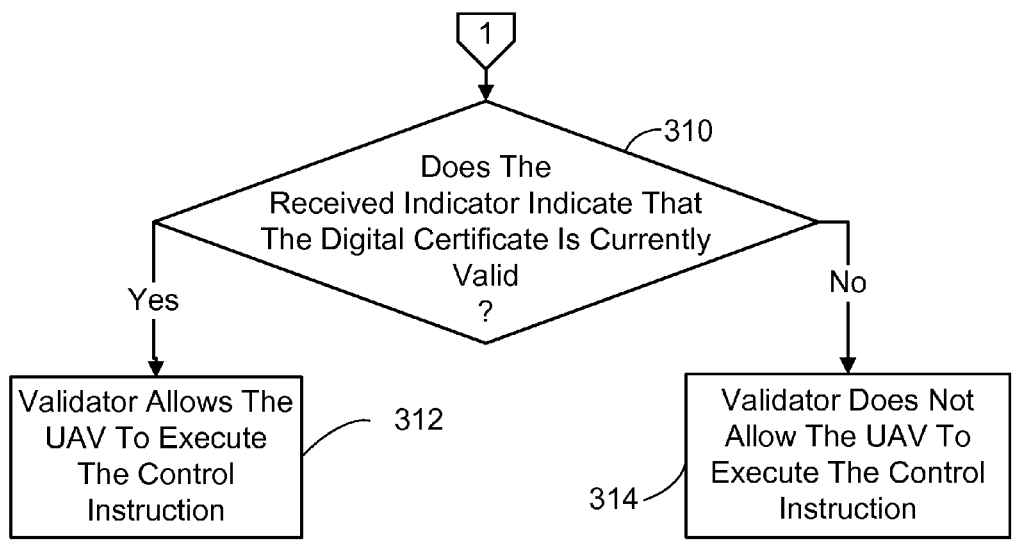

In one implementation, the control instruction authentication unit includes a validator operating on the aforementioned processor. Referring to FIGS. 3A-B, the validator receives a control instruction from a UAV controller device (action 300). The control instruction is used to launch, maneuver or land the UAV, among other things. The control instruction also includes a signed digital certificate.

The validator next determines if the digital certificate received in the control instruction is signed by a trusted signatory whose signature is in stored in the control instruction authentication unit's memory (action 302). As described previously, the trusted signatories can include an applicable governing agency and/or entities entrusted by the governing agency. If it is determined that the digital certificate is signed by a trusted signatory, the validator then transmits a validation request via the communication interface to a validation service to determine whether the digital certificate is currently valid (action 304). If not, the received control instruction is ignored and not executed by the UAV (action 306).

As described previously, the validation service generally ensures that the digital certificate is issued from the appropriate governing authority or an authorized surrogate, as well as checking that the digital certificate has not been revoked. Referring again to FIGS. 3A-B, the validation service returns an indication as to whether the certificate is currently valid, which is received by the validator via the communication interface (action 308). The validator next determines if the received indicator indicates that the digital certificate is currently valid (action 310). If it is currently valid, the validator allows the UAV to execute the control instruction (action 312). If, however, the received indicator indicates the digital certificate is invalid (for reasons including, but not limited to, a cancelled pilot license or revoked digital certificate), the validator does not allow the UAV to execute the control instruction (action 314).

It is noted that in one implementation, the control instruction received from the UAV controller device was entered into the controller device by a UAV pilot and the signed digital certificate included with the control instruction is associated with the pilot. Thus, whenever the aforementioned validation indicator indicates that the digital certificate associated with the pilot is currently valid, the validator allows the UAV to execute the control instruction that was initiated by the UAV pilot. However, whenever the validation indicator indicates that the digital certificate associated with the pilot is invalid, the validator does not allow the UAV to execute the control instruction that was initiated by the UAV pilot. In one version, though, the prohibition on executing the pilot's control instruction applies only if the UAV is in regulated airspace. The control instruction would be executed if the UAV is operating in non-regulated airspace (e.g., flying in low altitudes on private property or in areas outside the jurisdiction of the governing authority) despite having an invalid digital certificate (or no certificate at all).

1.3.1 Takeover Feature

The above-described UAV authentication scheme can include more than authenticating and executing control instructions initiated by a pilot authorized to operate a UAV. In one implementation, the UAV authentication scheme also includes a takeover feature. In general, the takeover feature allows an authorized agency to take control of a UAV from a pilot. For example, if a UAV pilot deviates from a prescribed flight path, or enters a restricted airspace (such as over sensitive or secured areas), or presents a national security/terror threat; an authorized agency can take control of a UAV from a pilot and safely divert, land or crash it depending on the circumstance, threat confidence, and/or urgency. This is regardless of whether the pilot has a currently valid digital certificate or not. It is noted that the agencies that can take control of a UAV can include more than the agency that issues UAV pilot licenses. For instance, these agencies can be local or national law enforcement bodies or military authorities.

Figure 4A:
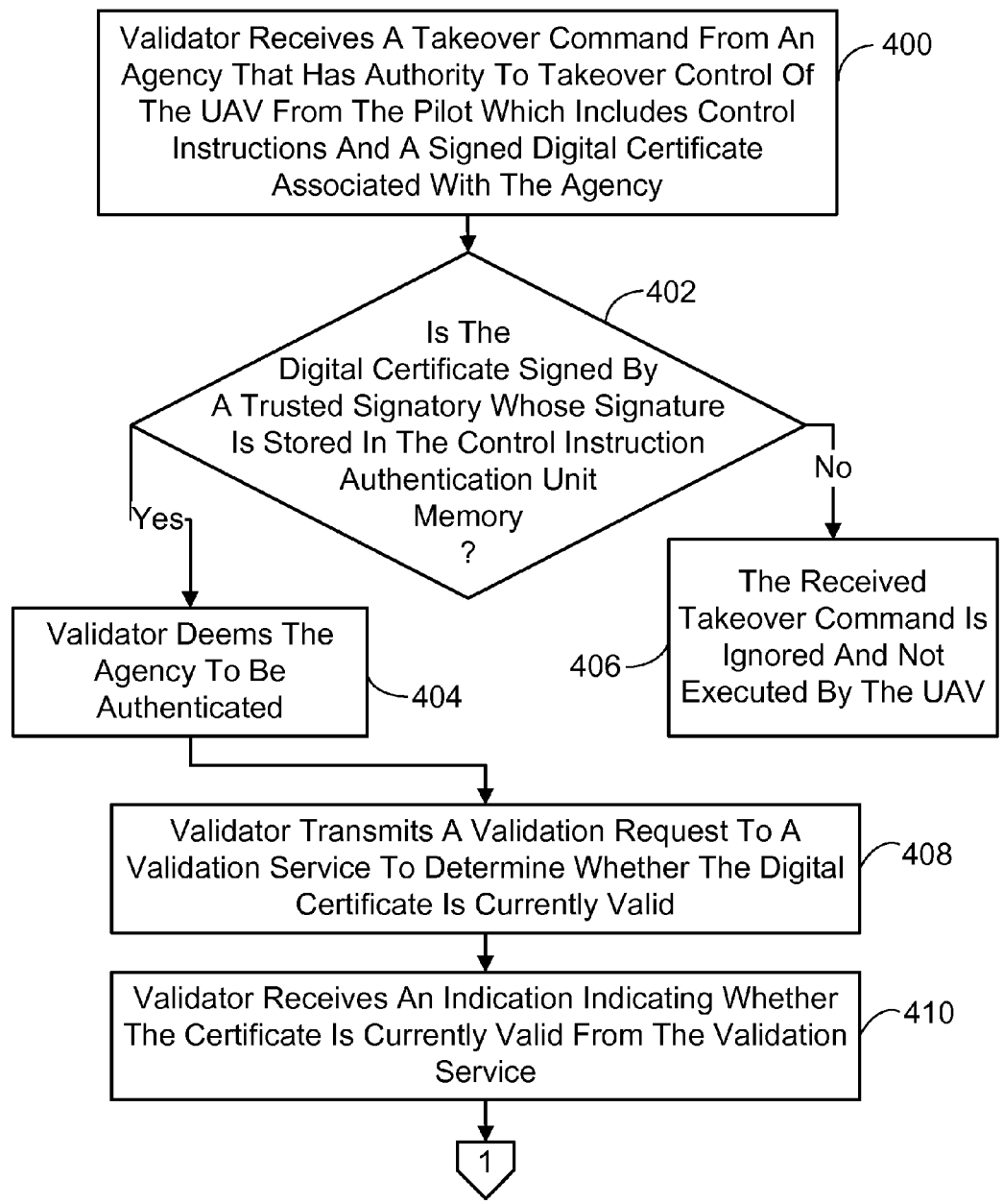
FIGS. 4A-B is a flow diagram illustrating an exemplary implementation, in simplified form, of a process used by a control instruction authentication unit resident in a UAV to validate a takeover command from an authorized agency using a validation service.
Figure 4B:
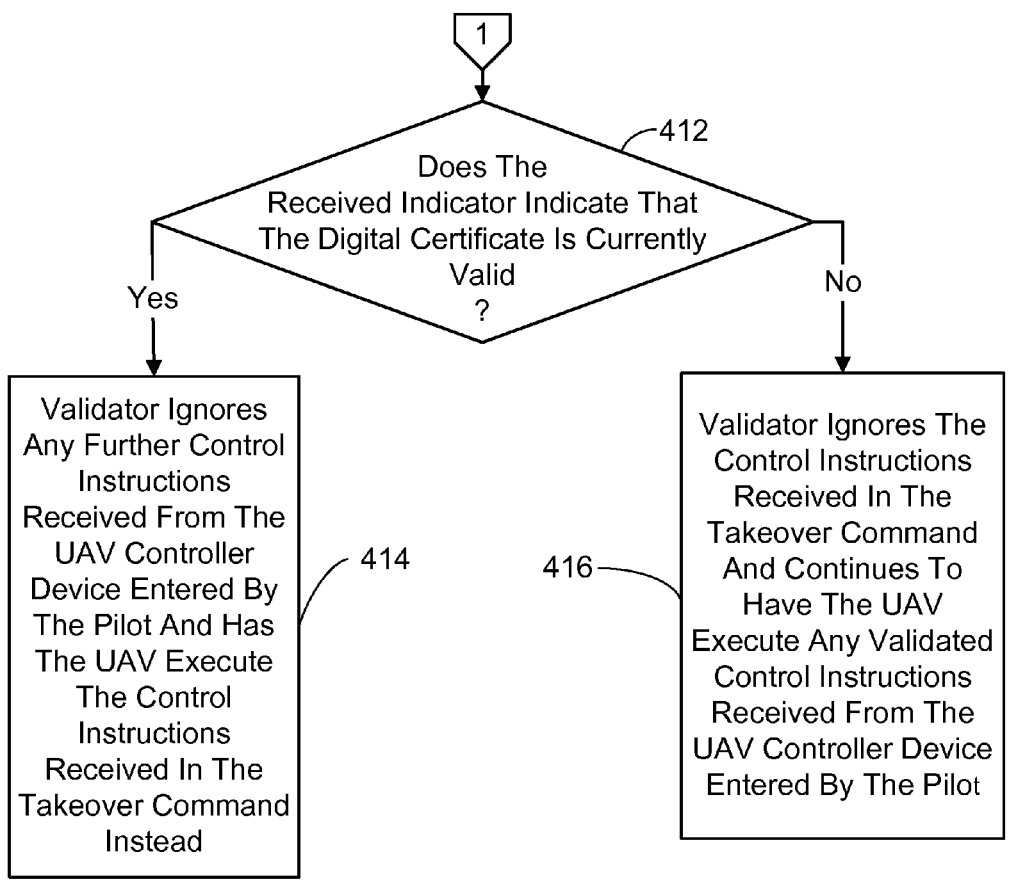

In order to do this takeover securely and to prevent just anyone from simply taking over a UAV, a procedure similar to validating the control signals initiated by a pilot is employed. In general, the UAV's control instruction authentication unit validates a takeover command from an authorized agency using the aforementioned validation service. More particularly, in one implementation illustrated in FIGS. 4A-B, the aforementioned control instruction authentication unit's validator receives a takeover command from an agency that has authority to takeover control of the UAV from the pilot (action 400). The takeover command includes control instructions and a signed digital certificate issued to the agency. The validator next determines if the digital certificate received in the takeover command is signed by a trusted signatory whose signature is in stored in the control instruction authentication unit's memory (action 402). If it is determined that the digital certificate is signed by a trusted signatory, the agency is deemed to be authenticated (action 404). If not, the received takeover command is ignored and not executed by the UAV (action 406).

Referring again to FIGS. 4A-B, if the agency is deemed to be authenticated, the validator then transmits a validation request via the communication interface to a validation service to determine whether the digital certificate is currently valid (action 408). The validation service returns an indication as to whether the certificate is currently valid, which is received by the validator via the communication interface (action 410). The validator next determines if the received indicator indicates that the digital certificate is currently valid (action 412). If it is currently valid, the validator ignores any further control instructions received from the UAV controller device entered by the pilot and has the UAV execute the control instructions received in the takeover command instead (action 414). It is noted that the foregoing authentication and validation procedure is repeated for any further control instruction that includes a digital certificate received from the agency. If, however, it is determined the received indicator indicates the digital certificate is invalid (for reasons including, but not limited to, a cancelled license or revoked digital certificate), the validator ignores the control instructions received in the takeover command and continues to have the UAV execute any validated control instructions received from the UAV controller device that were entered by the pilot (action 416).

It is noted that the pilot's digital certificate identifies the pilot, and prevents repudiation (i.e., often referred to as nonrepudiation). Thus, if the pilot's operation of the UAV causes an authorized agency to takeover control, the pilot will not be able to deny culpability based on the digital certificate that was used to control the UAV. Thus, safe flying is encouraged, and personal accountability and legal liability are facilitated.

It is further noted that in one implementation, in the event an authorized agency takes over a UAV, the validator transmits control instructions received from the UAV controller device that were entered by the pilot, to the validation service for auditing and logging. In addition, in one version, the validator also transmits the takeover command and any additional control instructions received from the agency to the validation service for auditing and logging. In this way, a record of the control instructions received by the UAV in a takeover situation is captured for any investigation that follows.

1.4 UAV Pilot Validation Service

In one implementation, the UAV pilot validation service is realized in a cloud based system often referred to as a cloud service. The term "cloud service" generally refers to a web application that operates in the cloud, and can be hosted on (e.g., deployed at) a plurality of data centers that can be located in different geographic regions (e.g., different regions of the world), and can be concurrently used by a plurality of remote end users. It is noted that although the system framework 100 in FIG. 1 depicts a single UAV controller device 102 and a single UAV 104 in communication with the UAV pilot validation service 106, it is envisioned that as a cloud service the UAV pilot validation service 106 will simultaneously handle multiple UAV controller-UAV pairs associated with different pilots.

The UAV pilot validation service is used to validate that a pilot is authorized to operate a UAV, as described previously. In various other previously-described implementations, the UAV pilot validation service validates pilot-initiated UAV control instructions, or takeover commands and additional control instructions received from an authorized agency, or logs control instruction and commands received by a UAV, or any combination of these tasks. Additionally, in one implementation, the UAV pilot validation service issues digital certificates to UAV pilots on behalf of an authorized governing agency thereby acting as a certificate issuing authority, or signs a digital certificate thereby acting as a trusted signatory, or both. Each of these functions will now be described in more detail.

1.4.1 Validating that a Pilot is Authorized to Operate a UAV

Figure 5:
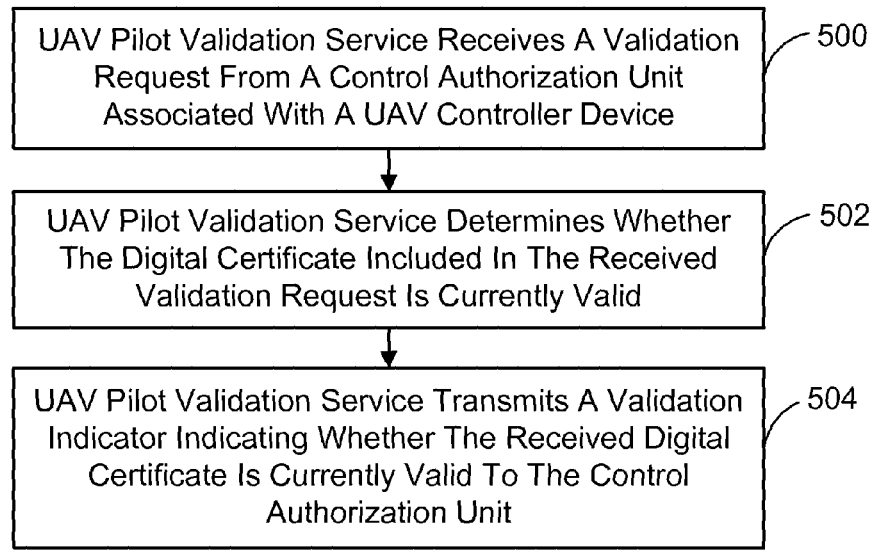
FIG. 5 is a flow diagram illustrating an exemplary implementation, in simplified form, of a process used by a cloud based or server-client based UAV pilot validation service to validate that a pilot is authorized to operate a UAV.

Referring to FIG. 5, in one implementation, the UAV pilot validation service receives a validation request from a control authorization unit associated with a UAV controller device (action 500). As indicated previously, this validation request includes a digital certificate that has been issued to and identifies a pilot of the UAV. The UAV pilot validation service then determines whether the digital certificate included in the received validation request is currently valid (action 502). A validation indicator indicating whether the received digital certificate is currently valid is then transmitted to the aforementioned control authorization unit (action 504). It is noted that in one version, determining whether the digital certificate is currently valid involves deeming the certificate to be invalid if it appears on a current list of revoked certificates. This list of revoked digital certificates is created and maintained by the governing agency authorized to issue the certificates, and can be made available via the agency's site on a computer network such as the Internet. It is noted that alternately, the list of revoked digital certificates could be hosted by the UAV pilot validation service on behalf of the governing agency.

1.4.2 Validating Pilot-Initiated UAV Control Instructions

Figure 6:
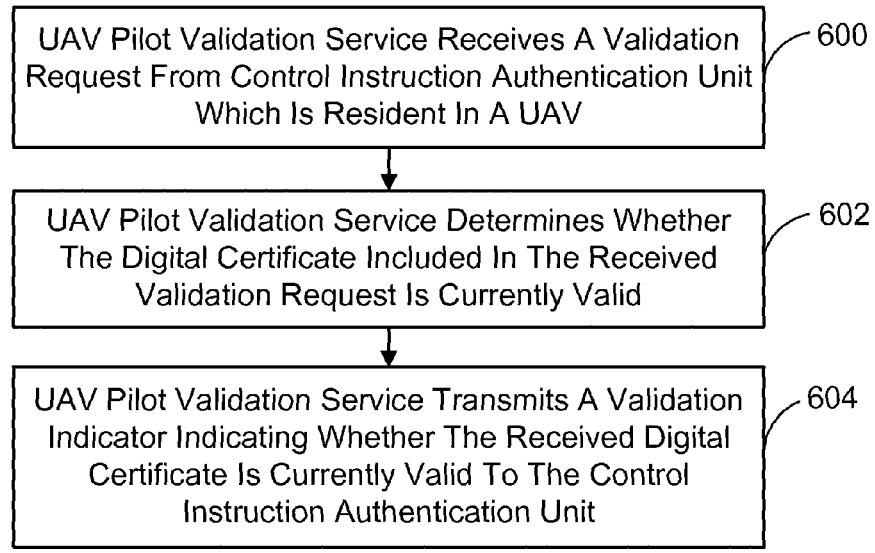
FIG. 6 is a flow diagram illustrating an exemplary implementation, in simplified form, of a process used by a cloud based or server-client based UAV pilot validation service to validate pilot-initiated UAV control instructions.

Referring to FIG. 6, in one implementation, the UAV pilot validation service receives a validation request from a control instruction authentication unit which is resident in a UAV (action 600). The validation request was sent in response to the control instruction authentication unit's receipt of a control instruction initiated by a UAV pilot via a UAV controller device. As indicated previously, this validation request includes a digital certificate that has been issued to and identifies the pilot of the UAV. The UAV pilot validation service then determines whether the digital certificate is currently valid (action 602). A validation indicator indicating whether the received digital certificate is currently valid is then transmitted to the control instruction authentication unit (action 604). It is noted that in one version, determining whether the digital certificate is currently valid involves deeming the certificate to be invalid if it appears on the aforementioned current list of revoked certificates.

It is noted that in one implementation, the foregoing validation request also includes the pilot-initiated control instruction received from the UAV control device. In this implementation, the received control instruction is saved by the UAV pilot validation service for the purpose of auditing and logging control instructions initiated by the UAV pilot.

Figure 7:
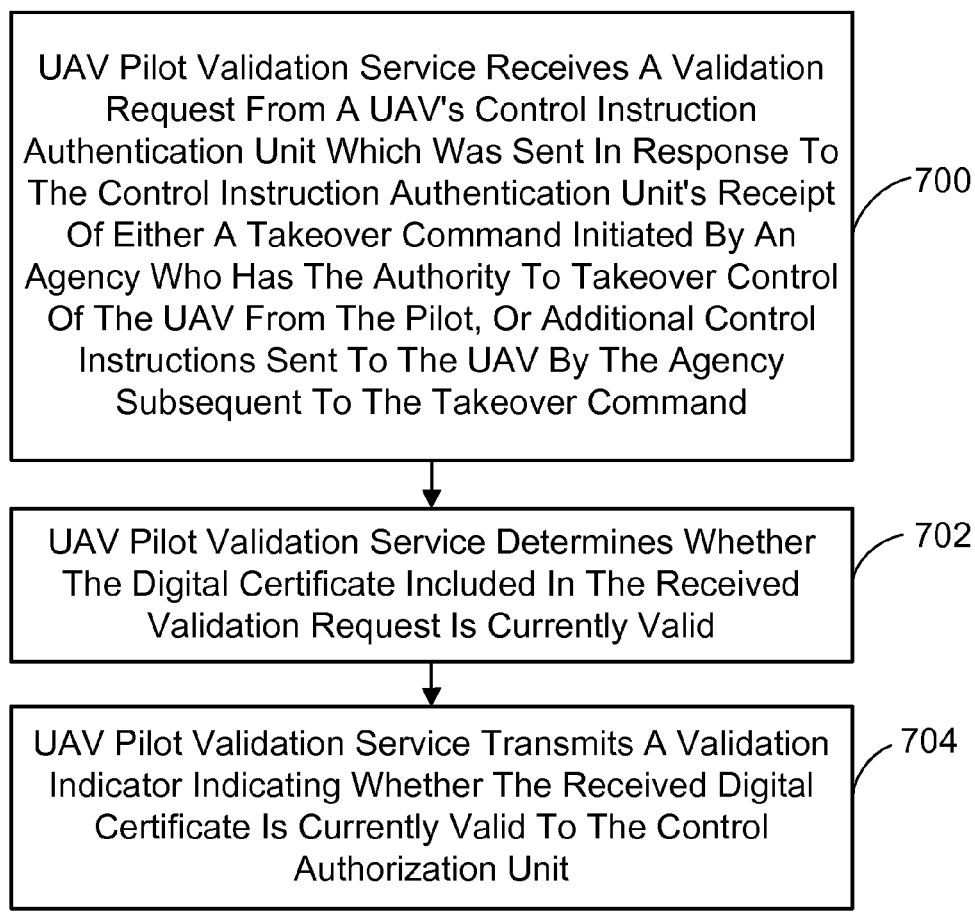
FIG. 7 is a flow diagram illustrating an exemplary implementation, in simplified form, of a process used by a cloud based or server-client based UAV pilot validation service to validate UAV takeover commands and control instructions initiated by an authorized agency.

1.4.3 Validating Agency-Initiated UAV Takeover Commands and Control Instructions Referring to FIG. 7, in one implementation, the UAV pilot validation service receives a validation request from a UAV's control instruction authentication unit which was sent in response to the control instruction authentication unit's receipt of either a takeover command initiated by an authorized agency who has the authority to takeover control of the UAV from the pilot, or additional control instructions sent to the UAV by the authorized agency subsequent to the takeover command (action 700). The validation request includes a digital certificate that has been issued to and identifies the authorized agency. The UAV pilot validation service then determines whether the digital certificate is currently valid (action 702). A validation indicator indicating whether the received digital certificate is currently valid is then transmitted to the control instruction authentication unit (action 704).

It is noted that in one implementation, the foregoing validation request also includes either control instructions received with a takeover command or the aforementioned additional control instructions. In this implementation, the received takeover command and control instructions are saved by the UAV pilot validation service for the purpose of auditing and logging commands and control instructions initiated by the authorized agency.

1.4.4 Issuing and Signing UAV Pilot Digital Certificates

As indicated previously, in one implementation, the UAV pilot validation service issues digital certificates to UAV pilots on behalf of an authorized governing agency, thereby acting as a registration authority or enrollment agent. It can also sign a digital certificate in one implementation, thereby acting as a trusted signatory.

Figure 8:
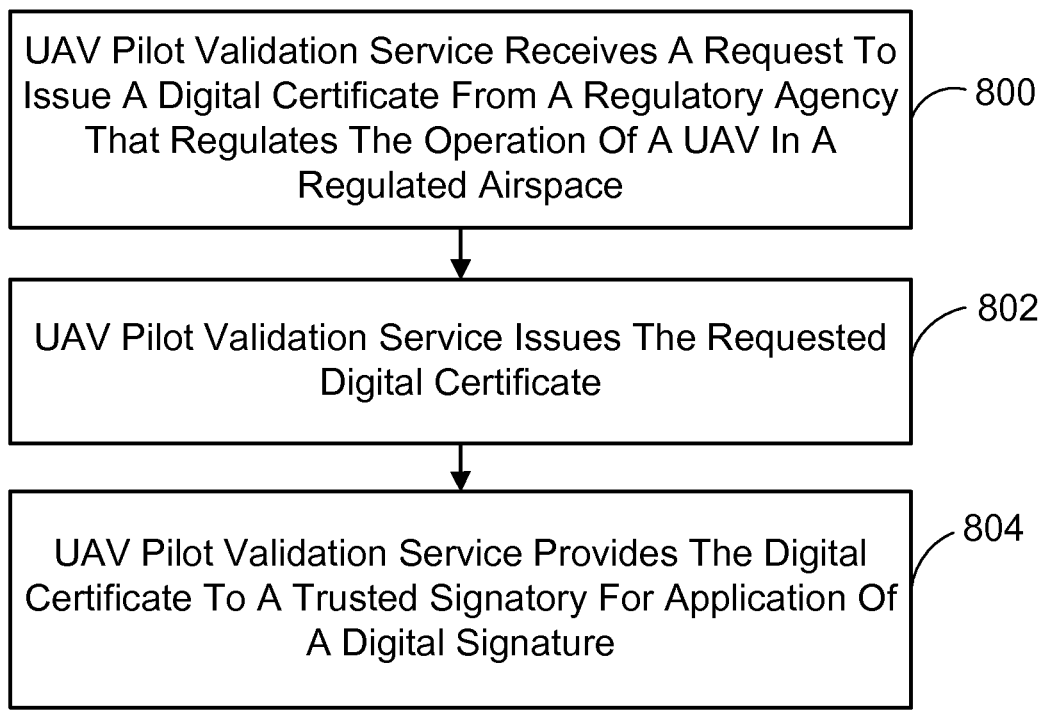
FIG. 8 is a flow diagram illustrating an exemplary implementation, in simplified form, of a process used by a cloud based or server-client based UAV pilot validation service to issue digital certificates to UAV pilots on behalf of an authorized governing agency

With regard to the UAV pilot validation service issuing digital certificates to UAV pilots, in one version shown in FIG. 8, this involves the service receiving a request to issue a digital certificate (often referred to as a certificate signing request (CSR)) from a regulatory agency that regulates the operation of a UAV in a regulated airspace (action 800). The UAV pilot validation service then issues the requested digital certificate (action 802), and provides it to a trusted signatory for application of a digital signature (action 804).

For example, after a governing agency (such as the FAA or DOD) issues a license to the pilot, that agency contacts UAV pilot validation service and submits a request for a digital certificate (e.g., a x509 type certificate). The digital certificate at least identifies a UAV pilot and indicates that the pilot is licensed to operate a UAV in the regulated airspace. In one implementation, the digital certificate meets the following requirements:

The certificate includes a private key associated with a public key encryption scheme;
The certificate is created for key exchange, exportable to a Personal Information Exchange (.pfx) file;
The certificate's subject name or subject alternate name matches the domain used to access the service; and
The certificate uses a minimum of 2048-bit encryption.

Other digital certificate formats and requirements are also possible. In addition, other encryption schemes, such as the one time password scheme, can be used instead.

However, to use the digital certificate, it has to be digitally signed by a trusted certificate signing authority. As indicated previously, these trusted signatories include the governing licensing agency (e.g., FAA, DoD), as well as other government, law enforcement and military agencies. In addition, the UAV pilot validation service or another service can be authorized by the governing licensing agency to act as a trusted signatory.

In the event that the UAV pilot validation service acts as a trusted signatory for the governing licensing agency, a digital certificate would be received from a certificate issuing authority (which in one version is the UAV pilot validation service itself), along with a request to digitally sign the certificate. The UAV pilot validation service digitally signs the digital certificate, and provides it to the UAV pilot (or in an alternate scheme to the governing licensing agency which in turn provides it to the pilot).

3.0 Exemplary Operating Environments

Figure 9:
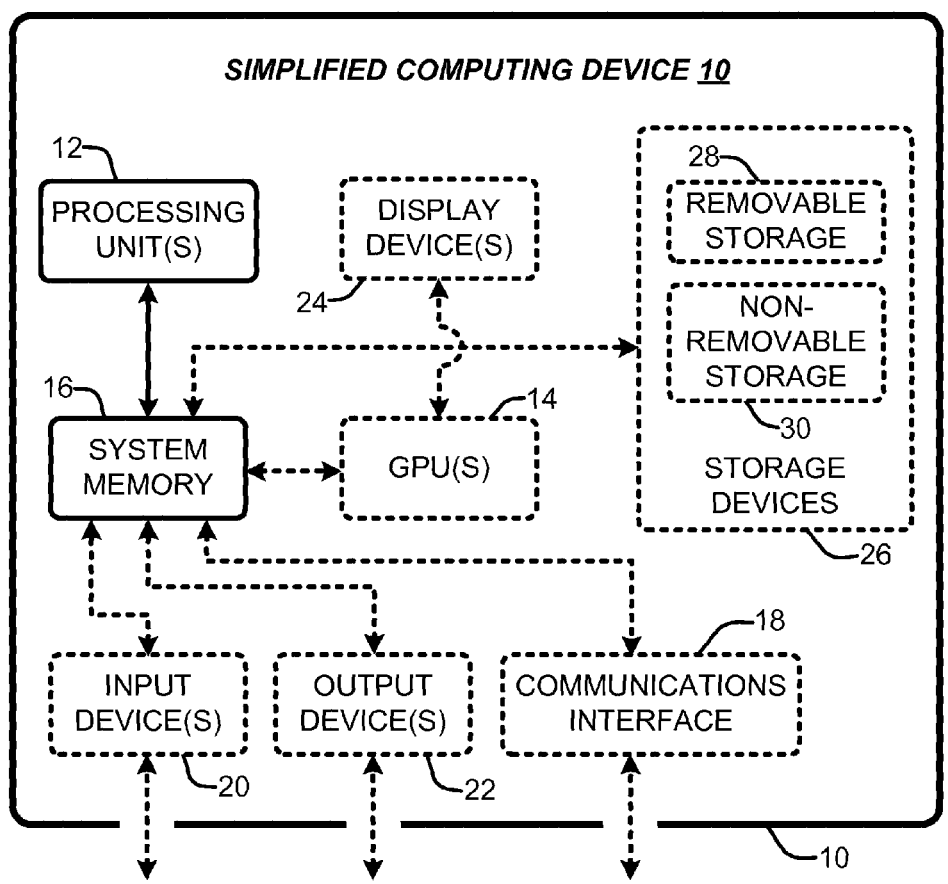
FIG. 9 is a diagram depicting a general purpose computing device constituting an exemplary system for use with the UAV piloting authorization implementations described herein.

Aspects of the UAV piloting authorization implementations described herein are operational using numerous types of general purpose or special purpose computing system environments or configurations. FIG. 9 illustrates a simplified example of a general-purpose computer system with which various aspects and elements of UAV piloting authorization, as described herein, may be implemented. It is noted that any boxes that are represented by broken or dashed lines in the simplified computing device 10 shown in FIG. 9 represent alternate implementations of the simplified computing device. As described below, any or all of these alternate implementations may be used in combination with other alternate implementations that are described throughout this document. The simplified computing device 10 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To realize the UAV piloting authorization implementations described herein, the device should have a sufficient computational capability and system memory to enable basic computational operations. In particular, the computational capability of the simplified computing device 10 shown in FIG. 9 is generally illustrated by one or more processing unit(s) 12, and may also include one or more graphics processing units (GPUs) 14, either or both in communication with system memory 16. Note that that the processing unit(s) 12 of the simplified computing device 10 may be specialized microprocessors (such as a digital signal processor (DSP), a very long instruction word (VLIW) processor, a field-programmable gate array (FPGA), or other micro-controller) or can be conventional central processing units (CPUs) having one or more processing cores.

In addition, the simplified computing device 10 may also include other components, such as, for example, a communications interface 18. The simplified computing device 10 may also include one or more conventional computer input devices 20 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 10 and with any other component or feature of wearable sensing, including input, output, control, feedback, and response to one or more users or other devices or systems associated with UAV piloting authorization, are enabled by a variety of Natural User Interface (NUI) scenarios. The NUI techniques and scenarios enabled by UAV piloting authorization include, but are not limited to, interface technologies that allow one or more users user to interact in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other sensors. Such NUI implementations are also enabled by the use of various techniques including, but not limited to, information derived from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices. Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the UAV piloting authorization implementations described herein.

However, it should be understood that the aforementioned exemplary NUI scenarios may be further augmented by combining the use of artificial constraints or additional signals with any combination of NUI inputs. Such artificial constraints or additional signals may be imposed or generated by input devices such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the UAV piloting authorization implementations described herein.

The simplified computing device 10 may also include other optional components such as one or more conventional computer output devices 22 (e.g., display device(s) 24, audio output devices, video output devices, devices for transmitting wired or wireless data transmissions, and the like). Note that typical communications interfaces 18, input devices 20, output devices 22, and storage devices 26 for general-purpose computers are well known to those skilled in the art, and will not be described in detail herein.

The simplified computing device 10 shown in FIG. 9 may also include a variety of computer-readable media. Computer-readable media can be any available media that can be accessed by the computer 10 via storage devices 26, and can include both volatile and nonvolatile media that is either removable 28 and/or non-removable 30, for storage of information such as computer-readable or computer-executable instructions, data structures, program modules, or other data. Computer-readable media includes computer storage media and communication media. Computer storage media refers to tangible computer-readable or machine-readable media or storage devices such as digital versatile disks (DVDs), blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, program modules, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, and/or computer program products embodying some or all of the various UAV piloting authorization implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

Aspects of the UAV piloting authorization implementations described herein may be further described in the general context of computer-executable instructions, such as program modules, being executed by a computing device. Generally, program modules include routines, programs, objects, components, data structures, and the like, that perform particular tasks or implement particular abstract data types. Aspects of the UAV piloting authorization implementations described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so on.

3.0 Other Implementations

It is noted that any or all of the aforementioned implementations throughout the description may be used in any combination desired to form additional hybrid implementations. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of the appended claims.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

4.0 Claim Support and Further Implementations

The following paragraphs summarize various examples of implementations which may be claimed in the present document. However, it should be understood that the implementations summarized below are not intended to limit the subject matter which may be claimed in view of the foregoing descriptions. Further, any or all of the implementations summarized below may be claimed in any desired combination with some or all of the implementations described throughout the foregoing description and any implementations illustrated in one or more of the figures, and any other implementations described below. In addition, it should be noted that the following implementations are intended to be understood in view of the foregoing description and figures described throughout this document.

In one implementation, an unmanned aerial vehicle (UAV) authorization system for authorizing a pilot to operate a UAV includes a UAV controller device and a control authorization unit. The control authorization unit includes a processor, a communication interface and memory, and is in communication, via the communication interface, with the UAV controller device that is in turn in communication with a UAV. The control authorization unit also includes an authorizer operating on the processor. This authorizer, among other things, receives an identification code from the UAV controller device that was entered into the UAV controller device by the pilot, transmits the identification code to a digital certificate storage unit, receives a signed digital certificate from the digital certificate storage unit whenever the identification code corresponds to the signed digital certificate, determines if the digital certificate is signed by a trusted signatory whose signature is in stored in the control authorization unit memory, and whenever it is determined the digital certificate is signed by a trusted signatory, deems the pilot to be authenticated. Whenever the pilot is authenticated, the authorizer transmits a validation request to a validation service to determine whether the digital certificate is valid, where the control authorization unit is in communication with the validation service via the communication interface. The authorizer then receives from the validation service, a validation indicator indicating whether the received digital certificate is currently valid. Whenever the received validation indicator indicates that the received digital certificate is currently valid, the authorizer authorizes the pilot to initiate control instructions via the UAV controller device and attaches the signed digital certificate to any control instructions initiated by the pilot. However, whenever the received validation indicator indicates that the digital certificate is invalid, the authorizer does not authorize the pilot to initiate control instructions via the UAV controller device and does not transmit the control instruction to the UAV for flights within a regulated airspace. In one version, the digital certificate storage unit is a smart card, and the UAV controller device has a built-in smart card reader or is in communication with an external smart card reader. Further, in one version, the identification code received from the UAV controller device was entered into the UAV controller device by the pilot using controls resident on the controller device.

In one implementation, an unmanned aerial vehicle (UAV) authorization system for authenticating and executing control instructions includes a UAV and a control instruction authentication unit. The control instruction authentication unit includes a processor, a communication interface and memory, and is resident in and in communication via the communication interface with the UAV that is in turn in communication with a UAV controller device. The control instruction authentication unit also includes a validator operating on the processor. This validator, among other things, receives a control instruction from the UAV controller device that includes a signed digital certificate, determines if the digital certificate is digitally signed by a trusted signatory whose digital signature is in stored in the control instruction authentication unit memory, and if it is determined the digital certificate is digitally signed by a trusted signatory, transmits an validation request to a validation service to determine whether the digital certificate is valid. The control instruction authentication unit is in communication with the validation service via a communication interface. The validator then receives from the validation service, a validation indicator indicating whether the received digital certificate is currently valid, and whenever the received validation indicator indicates that the received digital certificate is currently valid, allows the UAV to execute the received control instruction. In one version, the validator's receipt of the control instruction from the UAV controller device includes receiving a control instruction from the UAV controller device that was entered into the UAV controller device by a UAV pilot. The control instruction includes a signed digital certificate associated with the UAV pilot. The validator then transmits a validation request to a validation service to determine whether the digital certificate received with the control instruction is valid. In this version, whenever the aforementioned received validation indicator indicates that the received digital certificate is currently valid, the validator allows the UAV to execute the received control instruction received from the UAV controller device that was entered into the UAV controller device by the UAV pilot. However, whenever the received validation indicator indicates that the digital certificate is invalid, the validator does not allow the UAV to execute the control instruction received from the UAV controller device that was entered into the UAV controller device by the UAV pilot for flights within a regulated airspace. In one version, the validator's receipt of the control instruction from the UAV controller device includes receiving a takeover command from an agency who has the authority to takeover control of the UAV from the pilot. The takeover command includes control instructions and a signed digital certificate issued to the agency. The validator then transmits a validation request to a validation service to determine whether the digital certificate received with the control instruction is valid. In this version, whenever the aforementioned received validation indicator indicates that the received digital certificate is currently valid, the validator does not implement any further control instructions received from the UAV controller device that were entered into the UAV controller device by the pilot and implements the control instructions received in the takeover command. In one version, the validator, also receives additional control instructions and a signed digital certificate issued to the aforementioned agency, determines if the digital certificate is digitally signed by a trusted signatory whose digital signature is in stored in the control instruction authentication unit memory, and if so, deems the agency who transmitted the additional control instructions to be authenticated. Whenever the agency is authenticated, the validator then transmits a validation request to a validation service to determine whether the digital certificate is valid. A validation indicator indicating whether the received digital certificate is currently valid is then received from the validation service. Whenever the received validation indicator indicates that the digital certificate received from the agency is currently valid, the additional control instructions are implemented. In one version, the validator transmits the takeover command and any additional control instructions received from the agency, to the validation service for auditing and logging. And, in one version, the validator transmits unimplemented control instructions received from the UAV controller device that were entered into the UAV controller device by the pilot to the validation service for auditing and logging.

In one implementation, an unmanned aerial vehicle (UAV) pilot validation system for validating that a pilot is authorized to operate a UAV includes one or more computing devices, wherein the computing devices are in communication with each other via a computer network whenever there are multiple computing devices, and a computer program having program modules executable by the one or more computing devices. The one or more computing devices are directed by the program modules of the computer program to receive a validation request from a control authorization unit associated with a UAV controller device that is in communication with and which transmits control instructions to a UAV. The validation request includes a digital certificate that has been issued to and identifies a pilot of the UAV. The one or more computing devices are also directed by the program modules of the computer program to determine whether the digital certificate included in the received validation request is currently valid, and to transmit a validation indicator indicating whether the received digital certificate is currently valid to the control authorization unit. In one version, the program module for determining whether the digital certificate included in the received validation request is currently valid includes deeming the digital certificate to be invalid if it appears on a current list of revoked certificates.

In one version of the UAV pilot validation system, the one or more computing devices are further directed by the program modules of the computer program to receive a validation request from a control instruction authentication unit which is resident in a UAV and which received a control instruction including a digital certificate that has been issued to and identifies a pilot of the UAV. The validation request includes this digital certificate. Next, it is determined whether the digital certificate received from the control instruction authentication unit and included in the received validation request is currently valid, and a validation indicator indicating whether the received digital certificate is currently valid is transmitted to the control instruction authentication unit. In one version, the validation request received from the control instruction authentication unit resident in the UAV further includes a pilot-initiated control instruction, and wherein the computer program further includes a program module for saving the received pilot-initiated control instructions for auditing and logging of control instructions initiated by the UAV pilot. Further, in one version, the program module for determining whether the digital certificate received from the control instruction authentication unit and included in the received validation request is currently valid, includes deeming the digital certificate to be invalid if it appears on a current list of revoked certificates.

In one version of the UAV pilot validation system, the one or more computing devices are further directed by the program modules of the computer program to receive a validation request from the control instruction authentication unit which is resident in the UAV and which received a takeover command initiated by an agency who has the authority to takeover control of the UAV from the pilot. This validation request includes a digital certificate that has been issued to and identifies the agency. Next, it is determined whether the digital certificate received from the control instruction authentication unit and included in the received validation request is currently valid, and a validation indicator indicating whether the received digital certificate is currently valid is transmitted to the control instruction authentication unit. In one version of the UAV pilot validation system, the one or more computing devices are further directed by the program modules of the computer program to receive a validation request from the control instruction authentication unit which is resident in the UAV and which received additional control instructions initiated by the agency. This validation request includes the digital certificate issued to the agency. Next, it is determined whether the digital certificate received from the control instruction authentication unit and included in the received validation request is currently valid, and a validation indicator indicating whether the received digital certificate is currently valid is transmitted to the control instruction authentication unit. In one version, the takeover command received from the control instruction authentication unit resident in the UAV further includes control instructions, and the computer program further includes a program module for saving the received takeover command control instructions, or additional control instructions, or both for auditing and logging of control instructions initiated by the regulatory agency.

In one version of the UAV pilot validation system, the one or more computing devices are further directed by the program modules of the computer program to receive a request to issue a digital certificate from a regulatory agency that regulates the operation of a UAV in a regulated airspace. This digital certificate at least provides the identity of a UAV pilot and an indication that the pilot is licensed to operate a UAV in regulated airspace. Next, the requested digital certificate is issued such that the UAV pilot validation system is acting as a registration authority or enrollment agent. Then, the digital certificate is provided to a trusted signatory for application of a digital signature. In one version, the computer program further comprises program modules for receiving a digital certificate from a certificate issuing authority, along with a request to digitally sign the certificate. This digital certificate at least provides the identity of a UAV pilot and indicates that the pilot is licensed to operate a UAV in regulated airspace. Next, the digital certificate is digitally signed such that the UAV pilot validation system is acting as a trusted signatory. The signed digital certificate is then provided to the UAV pilot.

The implementations and versions described in any of the previous paragraphs in this section may also be combined with each other, and with one or more of the implementations and versions described prior to this section.

In various implementations, an unmanned aerial vehicle (UAV) authorization system is implemented by a means for authorizing a pilot to operate a UAV. For example, in one implementation, the authorization system includes a UAV controller device and a control authorization unit. The control authorization unit includes a processor, a communication interface and memory, and is in communication, via the communication interface, with the UAV controller device that is in turn in communication with a UAV. The control authorization unit further includes an authorizer operating on the processor that is configured to execute a receiving step for receiving an identification code from the UAV controller device that was entered into the UAV controller device by the pilot, a transmitting step for transmitting the identification code to a digital certificate storage unit, a second receiving step for receiving a signed digital certificate from the digital certificate storage unit whenever the identification code corresponds to the signed digital certificate, a determining step for determining if the digital certificate is signed by a trusted signatory whose signature is in stored in the control authorization unit memory, a deeming step for deeming the pilot to be authenticated whenever it is determined the digital certificate is signed by a trusted signatory, a second transmitting step for transmitting a validation request to a validation service to determine whether the digital certificate is valid whenever the pilot is authenticated, wherein the control authorization unit is in communication with the validation service via the communication interface, a third receiving step for receiving from the validation service, a validation indicator indicating whether the received digital certificate is currently valid, and an authorizing step for authorizing the pilot to initiate control instructions via the UAV controller device and attaching the signed digital certificate to any control instructions initiated by the pilot whenever the received validation indicator indicates that the received digital certificate is currently valid.

In various implementations, an unmanned aerial vehicle (UAV) authorization system is implemented by a means for authenticating and executing UAV control instructions. For example, in one implementation, the authorization system includes a UAV and a control instruction authentication unit. The control instruction authentication unit includes a processor, a communication interface and memory, which is resident in and in communication via the communication interface with the UAV that is in turn in communication with a UAV controller device. The control instruction authentication unit further includes a validator operating on the processor that is configured to execute a receiving step for receiving a control instruction from the UAV controller device, said control instruction comprising a signed digital certificate, a determining step for determining if the digital certificate is digitally signed by a trusted signatory whose digital signature is in stored in the control instruction authentication unit memory, a transmitting step for transmitting an validation request to a validation service to determine whether the digital certificate is valid if it is determined the digital certificate is digitally signed by a trusted signatory wherein the control instruction authentication unit is in communication with the validation service via the communication interface, a second receiving step for receiving from the validation service, a validation indicator indicating whether the received digital certificate is currently valid, and an allowing step for allowing the UAV to execute the received control instruction whenever the received validation indicator indicates that the received digital certificate is currently valid.

In various implementations, an unmanned aerial vehicle (UAV) pilot validation system is implemented by a means for validating that a pilot is authorized to operate a UAV. For example, in one implementation, the UAV pilot validation system includes one or more computing devices, the computing devices being in communication with each other via a computer network whenever there is a plurality of computing devices, and a computer program having program modules executable by the one or more computing devices, the one or more computing devices being directed by the program modules of the computer program to execute a number of steps. These steps include a receiving step for receiving a validation request from a control authorization unit associated with a UAV controller device that is in communication with and which transmits control instructions to a UAV, wherein the validation request includes a digital certificate that has been issued to and identifies a pilot of the UAV, a determining step for determining whether the digital certificate included in the received validation request is currently valid, and a transmitting step for transmitting a validation indicator indicating whether the received digital certificate is currently valid to the control authorization unit.

Wherefore, what is claimed is:

1. An unmanned aerial vehicle (UAV) authorization system for authorizing a pilot to operate a UAV, the system comprising:
   a UAV controller device; and
   a control authorization unit comprising a processor, a communication interface and memory, and which is in communication, via the communication interface, with the UAV controller device that is in turn in communication with a UAV, said control authorization unit further comprising,
      an authorizer operating on said processor for,
         receiving an identification code from the UAV controller device that was entered into the UAV controller device by the pilot,
         transmitting the identification code to a digital certificate storage unit,
         receiving a signed digital certificate from the digital certificate storage unit whenever the identification code corresponds to the signed digital certificate,
         determining if the digital certificate is signed by a trusted signatory whose signature is in stored in the control authorization unit memory, and
         whenever it is determined the digital certificate is signed by a trusted signatory, deeming the pilot to be authenticated, and
         whenever the pilot is authenticated, transmitting a validation request to a validation service to determine whether the digital certificate is valid, wherein said control authorization unit is in communication with the validation service via the communication interface,
         receiving from the validation service, a validation indicator indicating whether the received digital certificate is currently valid, and
         whenever the received validation indicator indicates that the received digital certificate is currently valid, authorizing the pilot to initiate control instructions via the UAV controller device and attaching the signed digital certificate to any control instructions initiated by the pilot.

2. The system of claim 1, further comprising, whenever the received validation indicator indicates that the digital certificate is invalid, the authorizer not authorizing the pilot to initiate control instructions via the UAV controller device and not transmitting the control instruction to the UAV for flights within a regulated airspace.

3. The system of claim 1, wherein the a digital certificate storage unit is a smart card, and the UAV controller device has a built-in smart card reader or is in communication with an external smart card reader.

4. The system of claim 1, wherein the identification code received from the UAV controller device was entered into the UAV controller device by the pilot using controls resident on the controller device.

5. An unmanned aerial vehicle (UAV) authorization system for authenticating and executing control instructions, the system comprising:
   a UAV; and
   a control instruction authentication unit comprising a processor, a communication interface and memory, which is resident in and in communication via the communication interface with the UAV that is in turn in communication with a UAV controller device, said control instruction authentication unit further comprising,
      a validator operating on said processor for,
         receiving a control instruction from the UAV controller device, said control instruction comprising a signed digital certificate,
         determining if the digital certificate is digitally signed by a trusted signatory whose digital signature is in stored in the control instruction authentication unit memory, and
         if it is determined the digital certificate is digitally signed by a trusted signatory, transmitting an validation request to a validation service to determine whether the digital certificate is valid, wherein said control instruction authentication unit is in communication with the validation service via the communication interface,
         receiving from the validation service, a validation indicator indicating whether the received digital certificate is currently valid, and
         whenever the received validation indicator indicates that the received digital certificate is currently valid, allowing the UAV to execute the received control instruction.

6. The system of claim 5, wherein:
   the validator receiving a control instruction from the UAV controller device, comprises receiving a control instruction from the UAV controller device that was entered into the UAV controller device by a UAV pilot, said control instruction comprising a signed digital certificate associated with the UAV pilot;
   whenever the received validation indicator indicates that the received digital certificate is currently valid, the validator allowing the UAV to execute the received control instruction comprises the validator allowing the UAV to execute the control instruction received from the UAV controller device that was entered into the UAV controller device by the UAV pilot; and
   the system further comprising, whenever the received validation indicator indicates that the digital certificate is invalid, the validator not allowing the UAV to execute the control instruction received from the UAV controller device that was entered into the UAV controller device by the UAV pilot for flights within a regulated airspace.

7. The system of claim 5, wherein:
   the validator receiving a control instruction from the UAV controller device, comprises receiving a takeover command from an agency who has the authority to takeover control of the UAV from the pilot, said takeover command comprising control instructions and a signed digital certificate issued to the agency; and
   whenever the received validation indicator indicates that the received digital certificate is currently valid, the validator allowing the UAV to execute the received control instruction comprises not implementing any further control instructions received from the UAV controller device that were entered into the UAV controller device by the pilot and implementing the control instructions received in the takeover command.

8. The system of claim 7, further comprising:
the validator transmitting unimplemented control instructions, received from the UAV controller device that were entered into the UAV controller device by the pilot, to the validation service for auditing and logging.

9. The system of claim 7, further comprising:
the validator,
receiving additional control instructions and a signed digital certificate issued to said agency,
determining if the digital certificate is digitally signed by a trusted signatory whose digital signature is in stored in the control instruction authentication unit memory, and
if it is determined the digital certificate is digitally signed by a trusted signatory, deeming the agency who transmitted the additional control instructions to be authenticated, and
whenever the agency is authenticated, transmitting an validation request to a validation service to determine whether the digital certificate is valid,
receiving from the validation service, a validation indicator indicating whether the received digital certificate is currently valid, and
whenever the received validation indicator indicates that the digital certificate received from the agency is currently valid, implementing the additional control instructions.

10. The system of claim 9, further comprising:
the validator transmitting the takeover command and any additional control instructions received from the agency, to the validation service for auditing and logging.

11. An unmanned aerial vehicle (UAV) pilot validation system for validating that a pilot is authorized to operate a UAV, the system comprising:
one or more computing devices, wherein said computing devices are in communication with each other via a computer network whenever there are multiple computing devices; and
a computer program having program modules executable by the one or more computing devices, the one or more computing devices being directed by the program modules of the computer program to,
receive a validation request from a control authorization unit associated with a UAV controller device that is in communication with and which transmits control instructions to a UAV, said validation request comprising a digital certificate that has been issued to and identifies a pilot of the UAV,
determine whether the digital certificate included in the received validation request is currently valid, and
transmitting to the control authorization unit, a validation indicator indicating whether the received digital certificate is currently valid.

12. The system of claim 11, wherein the program module for determining whether the digital certificate included in the received validation request is currently valid, comprises deeming the digital certificate to be invalid if it appears on a current list of revoked certificates.

13. The system of claim 11, wherein the computer program further comprises program modules for:
receiving a validation request from a control instruction authentication unit which is resident in a UAV and which received a control instruction comprising a digital certificate that has been issued to and identifies a pilot of the UAV, said validation request including said digital certificate;
determining whether the digital certificate received from the control instruction authentication unit and included in the received validation request is currently valid; and
transmitting to the control instruction authentication unit, a validation indicator indicating whether the received digital certificate is currently valid.

14. The system of claim 13, wherein the validation request received from the control instruction authentication unit resident in the UAV further comprises a pilot-initiated control instruction, and wherein the computer program further comprises a program module for saving the received pilot-initiated control instructions for auditing and logging of control instructions initiated by the UAV pilot.

15. The system of claim 13, wherein the program module for determining whether the digital certificate received from the control instruction authentication unit and included in the received validation request is currently valid, comprises deeming the digital certificate to be invalid if it appears on a current list of revoked certificates.

16. The system of claim 11, wherein the computer program further comprises program modules for:
receiving a validation request from the control instruction authentication unit which is resident in the UAV and which received a takeover command initiated by an agency who has the authority to takeover control of the UAV from the pilot, said validation request comprising a digital certificate that has been issued to and identifies the agency;
determining whether the digital certificate received from the control instruction authentication unit and included in the received validation request is currently valid; and
transmitting to the control instruction authentication unit, a validation indicator indicating whether the received digital certificate is currently valid.

17. The system of claim 16, wherein the computer program further comprises program modules for:
receiving a validation request from the control instruction authentication unit which is resident in the UAV and which received additional control instructions initiated by the agency, said validation request comprising said digital certificate issued to the agency;
determining whether the digital certificate received from the control instruction authentication unit and included in the received validation request is currently valid; and
transmitting to the control instruction authentication unit, a validation indicator indicating whether the received digital certificate is currently valid.

18. The system of claim 17, wherein the takeover command received from the control instruction authentication unit resident in the UAV further comprises control instructions, and wherein the computer program further comprises a program module for saving the received takeover command control instructions, or additional control instructions, or both for auditing and logging of control instructions initiated by the regulatory agency.

19. The system of claim 11, wherein the computer program further comprises program modules for:
receiving a request to issue a digital certificate from a regulatory agency that regulates the operation of a UAV in a regulated airspace, said digital certificate at least providing the identify of a UAV pilot and indicating that the pilot is licensed to operate a UAV in the regulated airspace;

issuing the requested digital certificate, thereby acting as a registration authority or enrollment agent; and providing the digital certificate to a trusted signatory for application of a digital signature.

20. The system of claim 11, wherein the computer program further comprises program modules for:

receiving a digital certificate from a certificate issuing authority, along with a request to digitally sign the certificate, said digital certificate at least providing the identify of a UAV pilot and indicating that the pilot is licensed to operate a UAV in the regulated airspace;

digitally signing the digital certificate, thereby acting as a trusted signatory; and providing the signed digital certificate to the UAV pilot.

* * * * *